United States Patent

Wiegert et al.

[15] 3,700,232
[45] Oct. 24, 1972

[54] SHEET STACKING APPARATUS

[72] Inventors: Albert Carl Wiegert, Pittsford; Edward Balmor Schoonmaker, East Rochester, both of N.Y.

[73] Assignee: Eastman Kodak Company, Rochester, N.Y.

[22] Filed: March 25, 1971

[21] Appl. No.: 127,983

[52] U.S. Cl. ............................271/75, 214/7, 271/86
[51] Int. Cl. .........................B65h 29/18, B65h 31/02
[58] Field of Search............271/75, 86, 76, 7, 87, 77, 271/78, 45; 214/7

[56] References Cited

UNITED STATES PATENTS

| | | | |
|---|---|---|---|
| 1,581,583 | 4/1926 | Low | 271/86 |
| 2,306,431 | 12/1942 | Exley | 214/7 |
| 3,261,603 | 7/1966 | Peterson et al. | 271/86 |
| 3,545,745 | 12/1970 | Herman | 271/75 |

OTHER PUBLICATIONS

Eichorn, R. N. and Holouka, C. " Conveyor Stacker." IBM Technical Disclosure Bulletin, Vol. 9, No. 12, May 1967.

*Primary Examiner*—Evon C. Blunk
*Assistant Examiner*—Bruce H. Stoner, Jr.
*Attorney*—W. H. J. Kline and Roger A. Fields

[57] ABSTRACT

Apparatus for stacking sheet-like articles, wherein a moving belt conveys the articles in generally shingled relation over a platform to a backstop. The backstop is disposed at the rear of the platform for successively guiding such conveyed articles into an orientation stacked substantially on edge across the moving belt. A slot in the platform is disposed forward of the backstop at a location beneath the moving belt for receiving successive portions of the belt should such portions be respectively urged into the slot by the weight of stacked articles. Accordingly, the friction force exerted on a stack of articles by the belt moving in contact therewith will be locally reduced where movement of the belt between the stack and the platform is facilitated by means of the slot.

7 Claims, 4 Drawing Figures

ALBERT C. WIEGERT
EDWARD B. SCHOONMAKER
INVENTORS

BY Roger A. Fields
W. H. J. Kline
ATTORNEYS

SHEET STACKING APPARATUS

BACKGROUND OF THE INVENTION

1. Field of the Invention

The present invention relates to sheet feeding or delivering apparatus, and more particularly to apparatus for successively receiving sheet-like articles and for stacking such articles substantially on edge in the succession received. Moreover, this invention relates to apparatus for delivering the articles into registry with previously stacked articles and which is improved so that the stacked articles will not topple over as further articles are delivered thereto.

2. Description of the Prior Art

Flexible sheet-like articles, such as cards and checks, can be passed from a source, such as a cutter, a microfilmer or a printer, onto a moving belt for conveyance to a stacking area without any interruption in the flow of the articles. Usually, the articles issue from the source at a continuous and high rate of speed and should be stacked in the stacking area at least as fast as the issue speed.

Apparatus for successively receiving sheet-like articles and for stacking the articles according to the succession received, wherein a moving continuous belt is adapted to convey the articles in an overlapping or shingled relation from an issuing source, is generally known in the art relating to such apparatus. Typically, apparatus of this kind includes a backstop which is disposed downstream along the path of article conveyance at an angle with respect to the belt for successively guiding the conveyed articles for stacking in file relation substantially on edge across the moving belt. However, in the apparatus generally known, as further articles are conveyed by the moving belt and guided by the backstop into registry with previously stacked articles, movement of the belt in contact with bottom edges of the stacked articles tends to pinch or compress the stacked articles together along such edges. This pinching effect induces the top edges of the stacked articles to separate from each other in a manner such that the stack will fan open. Accordingly, as the depth of the stack further increases by the addition of more articles, the tendency of the stacked articles to fan open correspondingly becomes greater so that the stacked articles may topple over into the moving belt and become a disorganized mass.

Therefore, it can be seen that a need exists for stacking apparatus of the foregoing kind but which is improved so as to significantly reduce the pinching effect normally exerted by the conveyor belt when moving in contact with a stationary stack of articles.

SUMMARY OF THE INVENTION

It is therefore an object of the present invention to provide novel and improved apparatus for stacking sheet-like articles.

It is a further object of the present invention to provide apparatus for stacking sheet-like articles wherein the articles are stacked substantially on edge.

Another important object of the present invention is to provide apparatus for successively receiving sheet-like articles and for stacking such articles substantially on edge in the succession received.

Yet another object of the present invention is to provide apparatus for delivering sheet-like articles into registry with previously stacked articles and which is improved so that the stacked articles will not topple over as further articles are delivered to the stack.

In accordance with a preferred embodiment of the present invention, there is disclosed hereinafter apparatus for stacking sheet-like articles wherein a moving belt conveys the articles in generally overlapping or shingled relation along a support surface to a backstop. The backstop is disposed on the support surface to successively guide such conveyed articles for stacking substantially on edge across the moving belt. A slot in the support surface is disposed forward of the backstop at a location beneath the moving belt for receiving successive portions of the belt should such portions be respectively urged into the slot by the weight of stacked articles which traverse the slot. Since the width of the support surface is relatively greater than the width of the belt, the surface will act as a support for stacked articles which urge the belt into the slot. Therefore, the friction force exerted by the belt when moving in contact with the bottom edges of a stack of articles will be locally reduced where movement of the belt between the stack and the support surface is facilitated by means of the slot. Such local reduction in friction is sufficient to remove the pinching or compressing effect otherwise exerted by the belt moving in contact with a stack of articles, so that the stacked articles will not topple over onto the moving belt.

BRIEF DESCRIPTION OF THE DRAWINGS

The above-mentioned and other features and objects of the present invention and the manner of obtaining them will become more apparent by reference to the following detailed description of the preferred embodiment of such invention taken in conjunction with the accompanying drawings wherein.

DESCRIPTION OF THE PREFERRED EMBODIMENT

Figure 1:
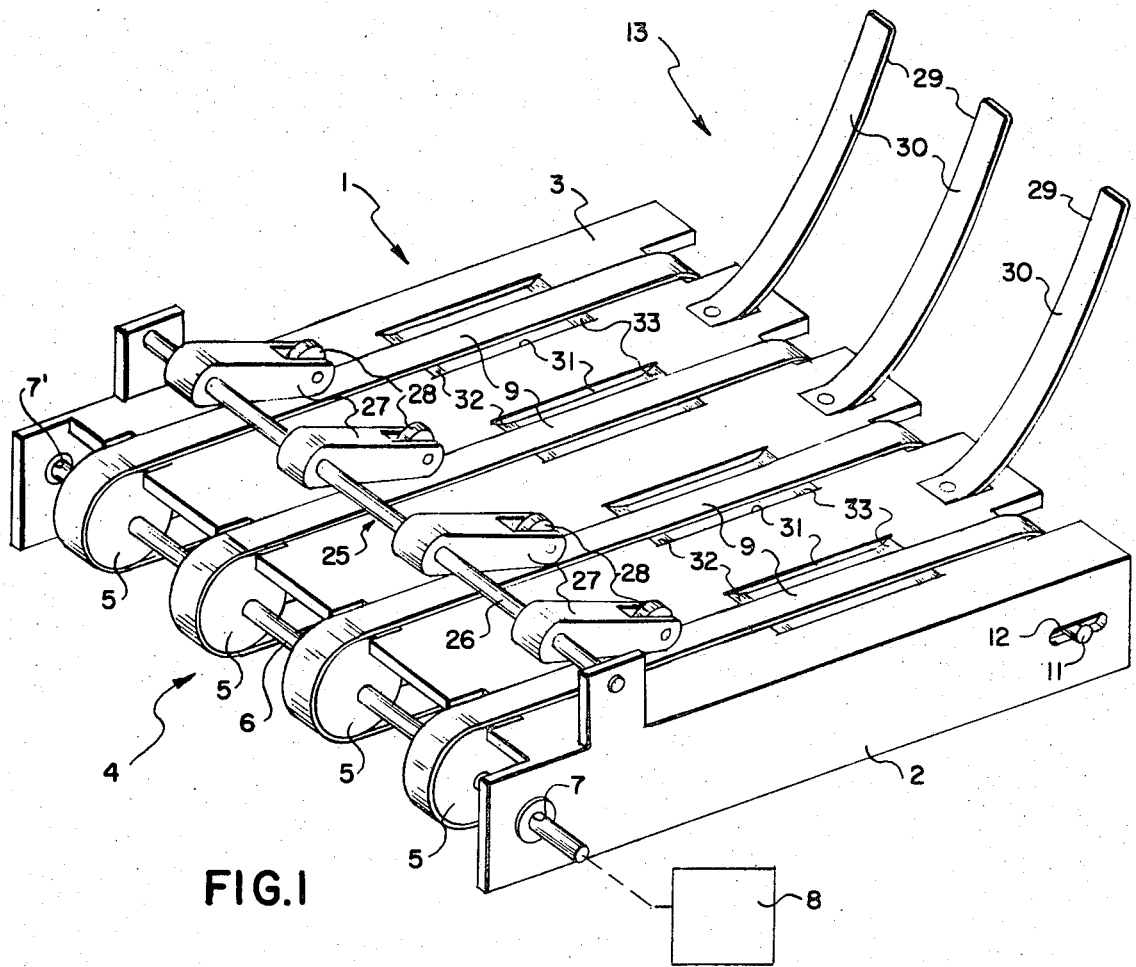
FIG. 1 is a perspective view of apparatus for stacking sheet-like articles in accordance with a preferred embodiment of the present invention.
Figure 2:
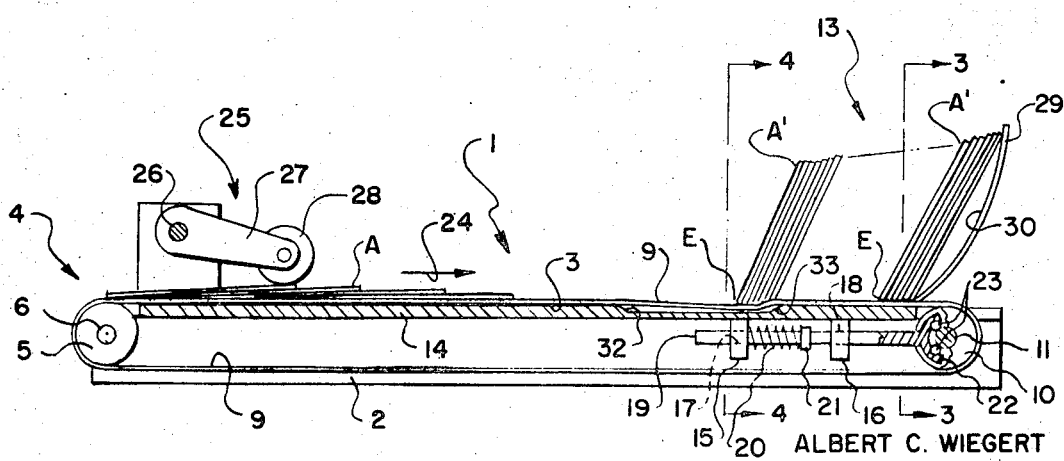
FIG. 2 is a typical section view of the stacking apparatus depicted in FIG. 1 and a plurality of sheet-like articles, showing the manner in which the articles are conveyed for stacking substantially on edge.

Referring now to the drawings and in particular to FIGS. 1 and 2, there is shown an apparatus 1 for successively receiving sheet-like articles A and for stacking such articles substantially on edge in the succession received. An elongate platform 2 having a flat support surface 3 can be disposed in a horizontal manner, as viewed in FIG. 2, alongside a source (not shown) which is adapted to issue the articles A in generally overlapping or shingled relation. In such way, the articles A can be deposited at a front receiving area 4 of the platform 2 directly from the issuing source.

Arranged across the front receiving area 4 of the platform 2, as shown in FIG. 1, several drive rollers 5 are mounted in spaced relation on a drive shaft 6 for rotation therewith relative to the platform. The opposite ends of the drive shaft 6 extend through opposed openings 7 and 7' in the platform 2 so as to rotatably couple the drive shaft to the platform. Moreover, a suitable drive device, such as an electrically powered motor 8, is connected to the drive shaft 6 in order to provide means for rotating the drive shaft and the drive rollers. The motor 8 furnishes the apparatus 1 with an independent power drive so that the apparatus may be driven separately from the source (not shown) which is adapted to issue the articles A. Alternatively, the apparatus 1 and the issuing source may be driven simultaneously by the same power drive (not shown).

As the motor 8 is driven to rotate the drive shaft 6 and the drive rollers 5, the drive rollers will in turn synchronously advance several continuous elasticized belts or bands 9. As shown in FIG. 1, the belts 9 are respectively wrapped around a portion of the peripheries of the drive rollers 5 and extend longitudinally in generally parallel spaced relation along the platform surface 3. At a rear stacking area 13 of the platform 2, the belts 9 are respectively wrapped around the peripheries of several idler rollers 10 which are mounted in spaced relation on an idler shaft 11 for rotation therewith relative to the platform, see FIGS. 1–3. The opposite ends of the idler shaft 11 extend through slots 12 and 12' in the platform 2 so as to rotatably couple the idler shaft to the platform in the vicinity of the stacking area 13. Accordingly, the idler shaft 11 is movable towards and away from the drive shaft 6 to tension and slacken the several belts 9 which extend therebetween.

Attached to an underside 14 of the platform 2, at a location adjacent the rear stacking area 13, is a pair of spaced brackets 15 and 16, see FIG. 2. The brackets 15 and 16 are provided with openings 17 and 18 which in turn movably support a rod 19. A helical compression spring 20 extends between the bracket 15 and a collar 21 which is fixed about the rod, so that the spring normally urges the rod toward the idler shaft 11. Connected to the rod 19, at the end closest to the idler shaft 11, is an arcuately-shaped shoe 22 on which is disposed several roller bearings 23. As can be seen in FIG. 2, the roller bearings 23 are normally positioned in abutting relation with the idler shaft 11 by the force of the spring 20. Consequently, the several elasticized belts 9 are tensioned in a front to rear manner relative to the platform 2 so that the articles A when ejected from the issuing source (not shown) can be deposited onto the belts at the front receiving area 4 and conveyed therefrom over the platform surface 3, in a downstream direction generally indicated by the arrow 24 in FIG. 2, to the rear stacking area 13.

To facilitate conveyance of the articles A over the platform surface 3 in the same arrangement in which they are received on the belts 9, i.e. a generally overlapping or shingled relation, there is provided a roller assembly 25 which is located immediately rearward of the front receiving area 4 of the platform 2, see FIGS. 1 and 2. The roller assembly 25 includes a rod 26 which is fixedly connected to the platform 2 and several idler roller-bearing arms 27 which are pivotally coupled to the rod. Springs (not shown) respectively located between each arm 27 and the rod 26, urge the arms so that their individual idler rollers 28 rest on the belts 9 in the manner shown by FIGS. 1 and 2.

Figure 3:
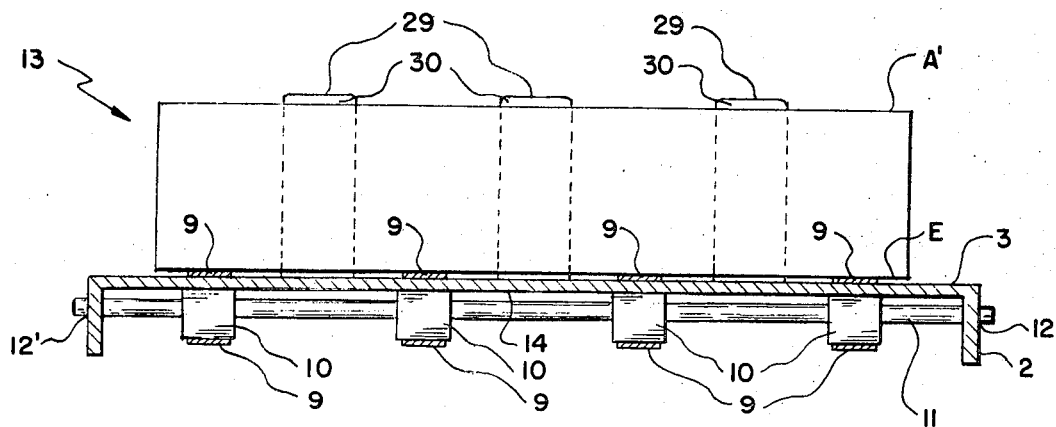
FIG. 3 is a section view of the stacking apparatus as viewed along the line 3—3 in FIG. 2.

Provided at the rear stacking area 13 of the platform 2, at a location slightly forward of the idler shaft 11 and the idler rollers 10, are several backstop fingers or stacking guides 29 which project upwardly from the platform surface 3 and against which the articles A are successively stacked substantially on edge in a manner similar to that illustrated by FIG. 2. Each backstop finger 29 includes a smooth arcuately-shaped guide surface 30 which is angularly disposed with respect to the platform surface 3. Therefore, as the articles A are conveyed in a substantially flat shingled relation over the platform surface 3 by the several moving belts 9, the first of the conveyed articles will be moved into edge contact with the guide surface 30 and urged upwardly therealong since the friction of contact between the conveyed articles and the guide surface is less than the friction of contact between such articles and the moving belts 9. Moreover, successive articles A will be similarly urged upward in front of previously stacked articles A' to maintain the sequential order of the articles which was present on the moving belts. Accordingly, as shown in FIG. 3, the articles A' will be stacked substantially on edge across the several moving belts 9.

It will be appreciated that suitable means may be provided to swing the backstop fingers 29 to different positions of angularity relative to the platform surface 3 in order to adapt the fingers for optimum stacking characteristics depending upon the weight of the articles A and the ejection speed from which the articles issue from a source (not shown). Such angular positions can readily be determined by one having ordinary skill in the art to which the present invention pertains.

Figure 4:
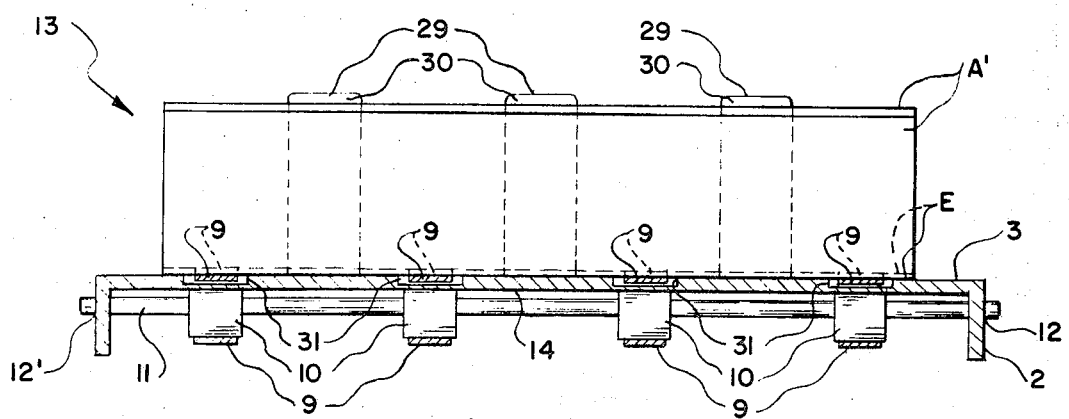
FIG. 4 is a section view of the stacking apparatus as viewed along the line 4—4 in FIG. 2.

Several slots or grooves 31 are disposed in parallel spaced relation at locations forward of the backstop fingers 29 and beneath respective ones of the belts 9, see FIG. 1. Each of the slots 31 is provided with a gradually inclined entrance edge 32 and an oppositely inclined exit edge 33 which serve to facilitate movement of successive portions of the belts 9 into and out of the slots should such belt portions be urged into the slots and moved therethrough in the manner shown by FIGS. 2 and 4. With reference to FIG. 2, it can be seen that as further articles A are delivered into registry with previously stacked articles A', the first-mentioned articles A will be stacked on the several moving belts 9 so as to extend across the slots 31. Accordingly, the weight of the articles A' stacked across the slots 31 will urge successive portions of the moving belts 9 into the slots so that such articles will come to rest on the platform surface 3 (which, preferably, is of a width dimension which is at least as large as the length dimension of the bottom edges E of the stacked articles), see FIG. 4. Moreover, the friction force exerted by the several belts 9 moving in contact with the bottom edges E of the stacked articles A' will be locally reduced where movement of the belts between the stacked articles and the platform surface 3 is facilitated by passage of the belt portions through the slots 31. Such local reduction in friction significantly reduces the pinching or compressing effect otherwise exerted by the moving belts 9 at the bottom edges E of the stacked articles A'. Therefore, the stacked articles A' will not fan open and topple over into the moving belts as in the prior art examples described hereinbefore.

It will be appreciated that the portions of the belts 9 moving through the slots 31, in fact, exert a friction force on the conveyed articles A which is sufficient to raise such articles for stacking but which, as described in the preceding paragraph, is reduced in comparison to the friction force exerted by the several belts when moving in contact with the stacked articles A' and the platform surface 3. Moreover, the exit edges 33 of the slots 31 are shown in FIGS. 1 and 2 to be spaced from the backstop fingers 29 so that sections of the platform surface 3 respectively extend between the backstop fingers and the slots in order to facilitate initial stacking of the articles A; although, in other variations (not shown) of the present invention, the slots can be disposed to extend the length of the platform surface 3.

From the foregoing description, taken in conjunction with the accompanying drawings, the construction, operation and use of the present invention will be readily understood by one having ordinary skill in the art to which such invention pertains.

The present invention has been described in considerable detail with particular reference to a preferred embodiment thereof, but it will be understood that variations and modifications can be effected within the spirit and scope of such invention.

We claim:

1. Apparatus for stacking sheet-like articles substantially on edge, said apparatus comprising:
   a belt;
   means for supporting said belt for movement of successive portions thereof from a first location, whereat such articles can be received on said belt, to a second location, whereat such articles are to be stacked substantially on edge;
   means for moving said belt from said first location to said second location;
   means, disposed at said second location, for guiding such articles from a substantially flat orientation on said belt to a stacked orientation substantially on edge across said belt;
   means defining a support surface for supporting such articles, said support surface extending beneath said belt from said second location toward said first location; and
   means defining a slot in said support surface for receiving successive portions of said belt, said slot being disposed at a location between said first and second locations and being spaced from said second location, whereby successive portions of said belt can be respectively urged into said slot by the weight of such articles.

2. Apparatus for successively receiving sheet-like articles in overlapping relation and for stacking such articles substantially on edge according to the succession received, said apparatus comprising:
   means defining a surface having a width of a first dimension;
   a continuous belt having a width of a second dimension which is less than said first dimension;
   means for supporting said belt for movement of successive portions thereof over said surface along a path of article conveyance;
   drive means for moving said belt over said surface to effect conveyance of such articles along said path;
   drive means for guiding such articles from a substantially flat overlapping orientation on said belt to a stacked orientation substantially on edge across said belt, said guiding means being disposed downstream in said path from a location at which such articles are received by said apparatus; and
   means defining a slot in said surface for receiving successive portions of said belt, said slot being disposed with respect to said path at a location spaced upstream from said guiding means, whereby successive portions of said belt can be respectively urged into said slot by the weight of a stack of such articles and a portion of said surface extends between said guiding means and said slot to facilitate initial stacking of such articles.

3. Apparatus as recited in claim 2, wherein said first dimension is at least as large as an edge dimension os such articles.

4. Apparatus for successively receiving sheet-like articles in overlapping relation and for stacking such articles substantially on edge according to the succession received, said apparatus comprising:
   a platform having a width at least as large as an edge dimension of such articles;
   a continuous belt having a width less than said platform width;
   means for supporting said belt for movement of successive portions thereof over said platform along a path of article conveyance;
   drive means for moving said belt over said platform to effect conveyance of such articles along said path;
   means for guiding such articles from a substantially flat overlapping orientation on said belt to a stacked orientation substantially on edge across said belt, said guiding means being disposed downstream in said path from a location at which such articles are received by said apparatus; and
   means defining a slot in said platform for receiving successive portions of said belt, said slot being disposed with respect to said path at a location spaced upstream from said guiding means and being of a width which is greater than said belt width but less than said platform width, whereby successive portions of said belt can be respectively urged into said slot by the weight of a stack of such articles and a portion of said surface extends between said guiding means and said slot to facilitate initial stacking of such articles.

5. Apparatus as recited in claim 4, wherein said guiding means includes:
   a pair of backstop members each having an arcuate guide surface; and
   means for mounting said members respectively on portions of said platform which extend alongside said belt and so that said guide surface of said members are disposed to guide articles conveyed along said path into said stacked orientation.

6. Apparatus for successively receiving sheet-like articles in overlapping relation and for stacking such articles according to the succession received, said apparatus comprising:
   a platform;
   a plurality of continuous belts;

means for supporting said belts in substantially parallel spaced relation for synchronous movement of successive portions thereof over said platform along a path of article conveyance;

drive means for moving said belts over said platform to effect conveyance of such articles along said path;

means for guiding such articles from a substantially flat orientation across said belts to a stacked orientation substantially on edge across said belts, said guiding means being disposed downstream along said path from a location at which such articles are received by said apparatus; and means defining a plurality of substantially parallel spaced slots for respectively receiving successive portions of said belts, said slots being disposed with respect to said path at locations spaced upstream from said guiding means and being further disposed beneath respective ones of said belts.

7. Apparatus as recited in claim 6, wherein said guiding means includes:

a plurality of backstop members each having an arcuate guide surface; and means for mounting said members respectively on portions of said support surface which extend between said belts and so that said guide surface of said members are disposed to guide articles conveyed along said path into said stacked orientation.

* * * * *